(12) United States Patent
Leach et al.

(10) Patent No.: US 12,254,646 B2
(45) Date of Patent: Mar. 18, 2025

(54) SYSTEM FOR REFINING A SIX DEGREES OF FREEDOM POSE ESTIMATE OF A TARGET OBJECT

(71) Applicant: The Boeing Company, Chicago, IL (US)

(72) Inventors: William K Leach, Castro Valley, CA (US); Leon Nguyen, Santa Ana, CA (US); Fan Hung, Woodland Hills, CA (US); Yang Chen, Westlake Village, CA (US); Deepak Khosla, Camarillo, CA (US); Haden H. Smith, Topanga, CA (US)

(73) Assignee: The Boeing Company, Arlington, VA (US)

( * ) Notice: Subject to any disclaimer, the term of this patent is extended or adjusted under 35 U.S.C. 154(b) by 667 days.

(21) Appl. No.: 17/556,157

(22) Filed: Dec. 20, 2021

(65) Prior Publication Data

US 2022/0215571 A1 Jul. 7, 2022

Related U.S. Application Data

(60) Provisional application No. 63/133,718, filed on Jan. 4, 2021.

(51) Int. Cl.
| | |
|---|---|
| *G06T 7/70* | (2017.01) |
| *B64D 39/00* | (2006.01) |
| *G06T 7/30* | (2017.01) |
| *G06V 10/40* | (2022.01) |

(52) U.S. Cl.
CPC ............ *G06T 7/70* (2017.01); *B64D 39/00* (2013.01); *G06T 7/30* (2017.01); *G06V 10/40* (2022.01); *G06T 2207/20084* (2013.01); *G06T 2207/30248* (2013.01)

(58) Field of Classification Search
None
See application file for complete search history.

(56) References Cited

U.S. PATENT DOCUMENTS

| | | |
|---|---|---|
| 7,142,981 B2 | 11/2006 | Hablani |
| 7,859,655 B2 | 11/2010 | Troy et al. |

(Continued)

FOREIGN PATENT DOCUMENTS

WO WO-2013102906 A2 * 7/2013 ............... B64D 3/00

OTHER PUBLICATIONS

Dung, Hoang Van & Hernandez, Danilo & Jo, Kang-Hyun. (Apr. 2014). Simple and Efficient Method for Calibration of a Camera and 2D Laser Rangefinder. 10.1007/978-3-319-05476-6_57.

(Continued)

*Primary Examiner* — Fan Zhang
(74) *Attorney, Agent, or Firm* — Harrity & Harrity, LLP

(57) ABSTRACT

A system for refining a six degrees of freedom pose estimate of a target object based on a one-dimensional measurement includes a camera and a range-sensing device. The range-sensing device is configured to determine an actual distance measured between the range-sensing device and an actual point of intersection. The range-sensing device projects a line-of-sight that intersects with the target object at the actual point of intersection. The system also includes one or more processors in electronic communication with the camera and the range-sensing device and a memory coupled to the processors. The memory stores data into one or more databases and program code that, when executed by the processors, causes the system to predict the six degrees of freedom pose estimate of the target object. The system also determines a revised six degrees of freedom pose estimate of the target object based on at least an absolute error.

20 Claims, 7 Drawing Sheets

(56) References Cited

U.S. PATENT DOCUMENTS

| | | |
|---|---|---|
| 8,620,023 B1 | 12/2013 | Plotke |
| 8,638,985 B2 | 1/2014 | Shotton et al. |
| 8,744,738 B2 | 6/2014 | Bushnell |
| 9,427,867 B2 | 8/2016 | Trautman et al. |
| 10,310,054 B2 | 6/2019 | Troy et al. |
| 10,388,029 B1 | 8/2019 | Taylor et al. |
| 10,393,504 B2 | 8/2019 | Hull |
| 10,402,675 B2 | 9/2019 | Owechko |
| 10,733,338 B2 | 8/2020 | Kwon et al. |
| 10,788,428 B2 | 9/2020 | Troy et al. |
| 2010/0042382 A1 | 2/2010 | Marsh et al. |
| 2010/0235129 A1 | 9/2010 | Sharma et al. |
| 2014/0240690 A1 | 8/2014 | Newman et al. |
| 2017/0197725 A1* | 7/2017 | Foo .................. B64U 70/97 |

OTHER PUBLICATIONS

Aghili, F. & Kuryllo, Marcin & Okouneva, Galina & English, Chad. (Jan. 2011). Fault-Tolerant Position/Attitude Estimation of Free-Floating Space Objects Using a Laser Range Sensor. Sensors Journal, IEEE. 11. 176-185.10.1109/JSEN.2010.2056365.

"Perspective-n-Point." Wikipedia, Sep. 19, 2021, <URL: https://en.wikipedia.org/wiki/Perspective-n-Point>.

Andert et al. "Optical-Aided Aircraft Navigation using Decoupled Visual SLAM with Range Sensor Augmentation", Journal of Intelligent Robot Systems, Jan. 14, 2017, pp. 547-565, vol. 88, No. 2.

Chen, et al. "Drogue tracking using 3D flash lidar for autonomous aerial refueling," Laser Radar Technology and Applications XVI, May 13, 2011, pp. 1-11, vol. 8037, No. 1, Society of Photo-Optical Instrumentation Engineers (SPIE).

Duan et al. "Visual Measurement in Simulation Environment for Vision-Based UAV Autonomous Aerial Refueling", IEEE Transactions on Instrumentation and Measurement, Sep. 1, 2015, pp. 2468-2480, vol. 64, No. 9, IEEE.

European Patent Office. Extended European search report for EP Application No. 20216303.4, mailed Jun. 2, 2022, pp. 1-10.

Zhang et al. "Binocular Pose Estimation for UAV Autonomous Aerial Refueling via Brain Storm Optimization", 2019 IEEE Congress on Evolutionary Computation (CEC), IEEE, Jun. 10, 2019, pp. 254-261.

* cited by examiner

SYSTEM FOR REFINING A SIX DEGREES OF FREEDOM POSE ESTIMATE OF A TARGET OBJECT

CROSS-REFERENCE TO RELATED APPLICATION

This application claims priority to U.S. Provisional Application No. 63/133,718, filed Jan. 4, 2021. The contents of the application are incorporated herein by reference in its entirety.

INTRODUCTION

The present disclosure relates to a system and method of refining a six degrees of freedom pose estimate of a target object. More particularly, the present disclosure is directed towards a system and method of refining a six degrees of freedom pose estimate of the target object based on a single one-dimensional measurement.

BACKGROUND

Six degrees of freedom (6DOF) refers to the freedom of movement of a rigid body in three-dimensional space. Specifically, the rigid body may move in three dimensions, on the x, y and z axes, as well as change orientation between the three axes though rotation, which are referred to as pitch, roll, and yaw.

Image-based pose estimation systems may estimate a six degrees of freedom pose of an object. Furthermore, many image-based pose estimation systems also utilize some type of refinement process for revising an initial six degrees of freedom pose estimate. Some types of pose estimate refinement processes utilize a three-dimension depth map or, in the alternative, numerous two-dimension distance measurements where a laser range finder is used to take the two-dimensional distance measurements. However, both the three-dimensional depth map and the two-dimensional distance measurements typically require significant processing and memory allocation requirements. Moreover, the laser range finder used in the two-dimensional distance measurement approach may require precisely manufactured moving parts in order to maintain consistent two-dimensional distance measurements, which in turn adds cost to the system. Additionally, some types of pose estimate refinement approaches may require specialized calibration patterns or correspondence markers for registering the scan lines of the laser range finder with corresponding features that are part of a model.

SUMMARY

According to several aspects, a system for refining a six degrees of freedom pose estimate of a target object based on a one-dimensional measurement is disclosed. The system includes a camera configured to capture image data of the target object and a range-sensing device configured to determine an actual distance measured between the range-sensing device and an actual point of intersection. The range-sensing device projects a line-of-sight that intersects with the target object at the actual point of intersection. The system also includes one or more processors in electronic communication with the camera and the range-sensing device as well as a memory coupled to the one or more processors. The memory stores data into one or more databases and program code that, when executed by the one or more processors, causes the system to predict, based on the image data of the target object, the six degrees of freedom pose estimate of the target object. The system determines an estimated point of intersection representing where the line-of-sight intersects with the six degrees of freedom pose estimate of the target object. The system also determines an estimated distance measured between the range-sensing device and the estimated point of intersection. The system calculates an absolute error associated with the six degrees of freedom pose estimate of the target object based on a difference between the actual distance and the estimated distance. The system then determines a revised six degrees of freedom pose estimate of the target object based on at least the absolute error.

In another aspect, an aerial refueling system for a supply aircraft is disclosed. The aerial refueling system includes a boom assembly including a nozzle and a system for determining a revised six degrees of freedom pose estimate of a fuel receptacle located on a receiver aircraft. The nozzle of the boom assembly is configured to engage with a fuel receptacle of the receiver aircraft during a refueling operation. The system includes a camera configured to capture image data of the receiver aircraft and the fuel receptacle and a range-sensing device configured to determine an actual distance measured between the range-sensing device and an actual point of intersection. The range-sensing device projects a line-of-sight that intersects with the receiver aircraft at the actual point of intersection. The system also includes one or more processors in electronic communication with the camera and the range-sensing device and a memory coupled to the one or more processors. The memory stores data into one or more databases and program code that, when executed by the one or more processors, causes the system to predict, based on the image data of the fuel receptacle located on a receiver aircraft, the six degrees of freedom pose estimate of the fuel receptacle located on the receiver aircraft. The system determines an estimated point of intersection representing where the line-of-sight intersects with the six degrees of freedom pose estimate of the receiver aircraft. The system determines an estimated distance measured between the range-sensing device and the estimated point of intersection. The system calculates an absolute error associated with the six degrees of freedom pose estimate of the fuel receptacle located on the receiver aircraft based on a difference between the actual distance and the estimated distance. The system then determines a revised six degrees of freedom pose estimate based on at least the absolute error.

In yet another aspect, a method for refining a six degrees of freedom pose estimate of a target object is disclosed. The method includes capturing, by a camera, image data of the target object. The method also includes determining, by a range-sensing device, an actual distance measured between the range-sensing device and an actual point of intersection, where the range-sensing device projects a line-of-sight that intersects with the target object at the actual point of intersection. The method also includes predicting, based on the image data of the target object, the six degrees of freedom pose estimate of the target object. The method further includes determining an estimated point of intersection representing where the line-of-sight intersects with the six degrees of freedom pose estimate of the target object. The method further includes determining an estimated distance measured between the range-sensing device and the estimated point of intersection. The method also includes calculating an absolute error associated with the six degrees of freedom pose estimate of the target object based on a difference between the actual distance and the estimated distance. Finally, the method includes determining a revised six degree of freedom pose estimate based on at least the absolute error.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure relates to a system and method of refining a six degrees of freedom pose estimate of a target object based on a single one-dimensional measurement. The system includes a control module in electronic communication with a camera and a range-sensing device. The camera is configured to capture image data of the target object, and the range-sensing device is configured to determine the one-dimensional measurement. The range-sensing device determines an actual distance measured between the range-sensing device and an actual point of intersection W'. Specifically, the actual point of intersection W' represents where a line-of-sight projected by the range-sensing device intersects with the target object. The system determines the six degrees of freedom pose estimate of the target object based on the image data captured by the camera. The system then determines an estimated point of intersection representing where the line-of-sight intersects with the six degrees of freedom pose estimate of the target object. The system then determines an estimated distance measured between the range-sensing device and the estimated point of intersection. The system calculates an absolute error based on a difference between the actual distance and the estimated distance. In an embodiment, the system also determines a reprojection error introduced by the six degrees of freedom pose estimate of the target object. The system then determines a revised pose estimate of the target object based on the absolute error and, if available, the reprojection error.

The following description is merely exemplary in nature and is not intended to limit the present disclosure, application, or uses.

Figure 1:
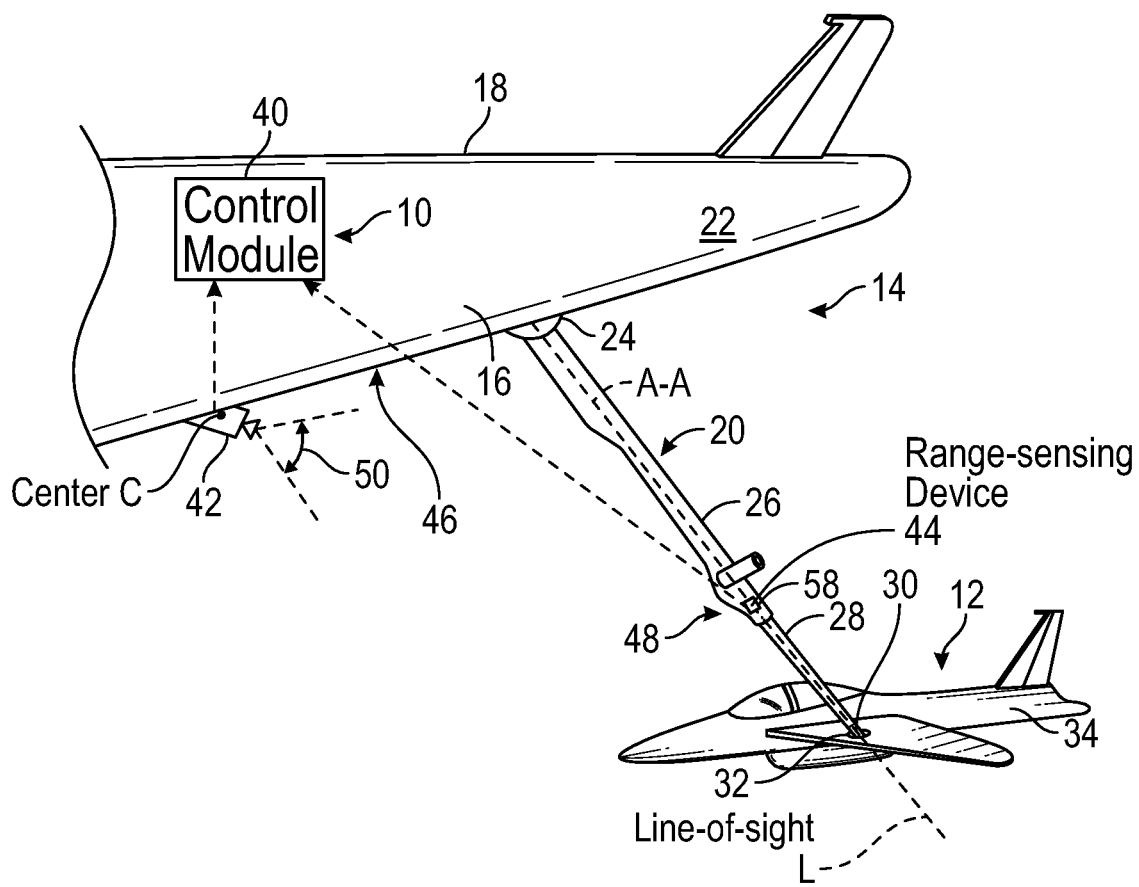
FIG. 1 is an illustration of the disclosed system for refining a six degrees of freedom pose estimate of a target object, where the system is located upon a supply aircraft and the target object is a fuel receptacle of a receiver aircraft, according to an exemplary embodiment.

Referring to FIG. 1, a system 10 for refining a six degrees of freedom pose estimate 8 (seen in FIG. 2) of a target object 12 is illustrated. In the example as shown in FIG. 1, the system 10 is part of an aerial refueling system 14 located at a tail section 16 of a tanker or supply aircraft 18. The aerial refueling system 14 includes a boom assembly 20 connected to a fuselage 22 of the supply aircraft 18 at an articulating joint 24. The boom assembly 20 includes a rigid portion 26, a telescoping extension 28, and a nozzle 30. The nozzle 30 of the boom assembly 20 is engaged with a fuel receptacle 32 of a receiver aircraft 34 during a refueling operation. In the example as shown, the receiver aircraft 34, and in particular the fuel receptacle 32, represent the target object 12. Accordingly, the system 10 refines the six degrees of freedom pose estimate 8 (FIG. 2) of the fuel receptacle 32 and the receiver aircraft 34. The system 10 includes a control module 40 in electronic communication with a camera 42 and a range-sensing device 44. The camera 42 is positioned in a location to capture image data of the target object 12 (i.e., the fuel receptacle 32 and the receiver aircraft 34). The control module 40 predicts the six-degree of freedom pose estimate 8 of the target object 12 based on the image data captured by the camera 42.

Figure 2:
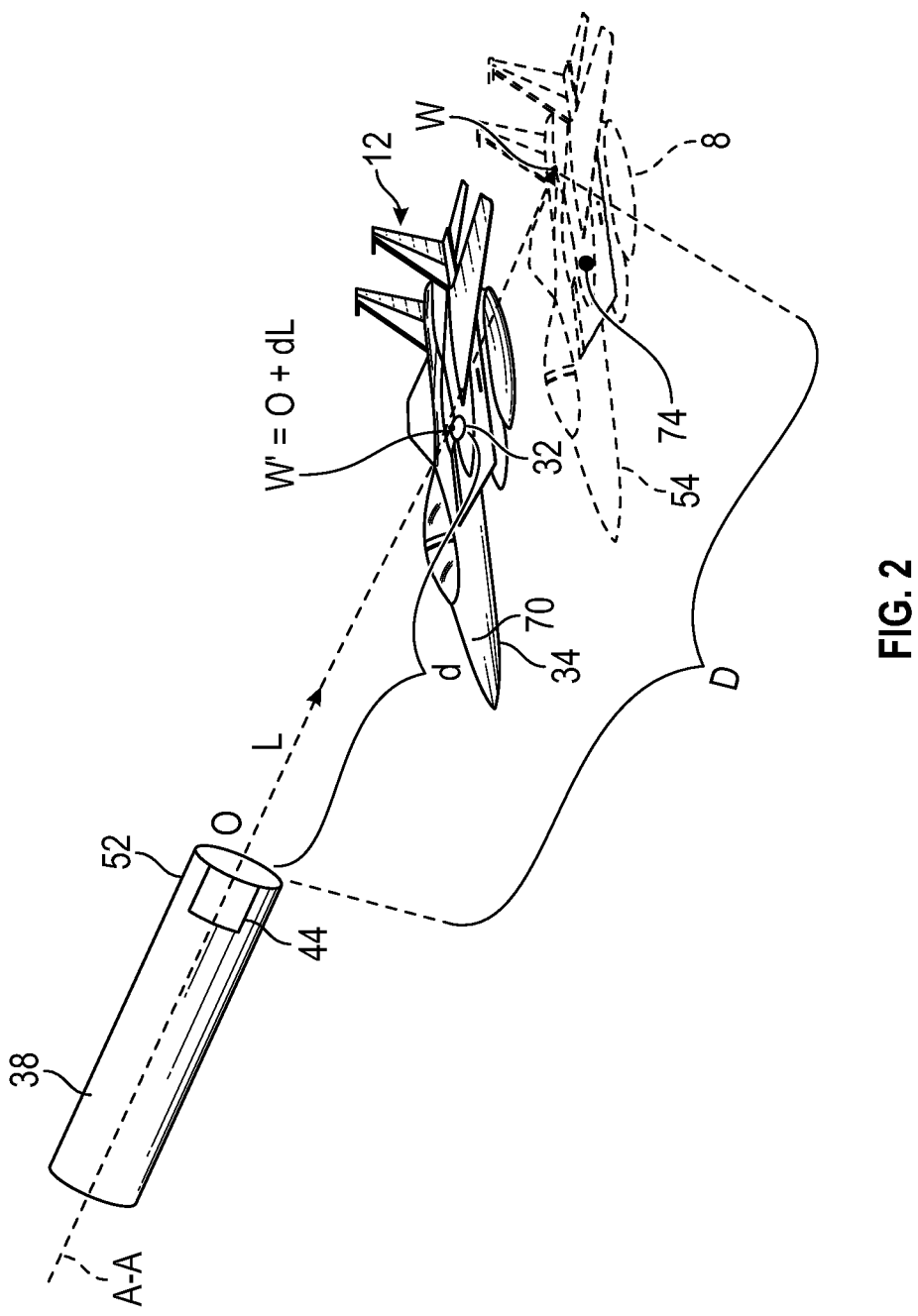
FIG. 2 is a diagram illustrating an extending arm, the receiver aircraft, and the six degrees of freedom pose estimate of the supply aircraft, according to an exemplary embodiment.

Referring to both FIGS. 1 and 2, the range-sensing device 44 is configured to determine an actual distance d between the range-sensing device 44 (shown in FIG. 2) and the target object 12 (i.e., the fuel receptacle 32). The actual distance d represents a single one-dimensional measurement determined by the range-sensing device 44. As explained below, the control module 40 of the system 10 determines an absolute error associated with the six degrees of freedom pose estimate 8 of the target object 12 based on the actual distance d. In an embodiment, the control module 40 determines a revised six degrees of freedom pose estimate of the target object 12 based on the absolute error. As explained also below, in another embodiment the control module 40 also determines a reprojection error associated with estimating the six degrees of freedom pose estimate 8, and then determines the revised six degrees of freedom pose estimate based on both the reprojection error and the absolute error.

In the example as shown in FIG. 1, the control module 40 determines a position and an orientation of the boom assembly 20 based on the revised six degrees of freedom pose estimate. However, it is to be appreciated that FIG. 1 is merely exemplary in nature and the system 10 is not limited to the aerial refueling system 14. Indeed, the system 10 may be used in a variety of other applications where a six degrees of freedom pose estimate of a rigid object is estimated. As seen in FIG. 2, the system 10 includes an extendable arm 38. The extendable arm 38 is represented by the boom assembly 20 shown in FIG. 1, however, it is to be appreciated that the extendable arm 38 is not limited to the boom assembly 20. For example, in another embodiment, the extendable arm 38 is a robotic arm that grasps and manipulates objects. In this example, the control module 40 determines a position and an orientation of the extendable arm 38 based on the revised six degrees of freedom pose estimate as the extendable arm 38 grasps and manipulates an object.

The camera 42 sends a video or image feed to the control module 40. In the non-limiting embodiment as shown in FIG. 1, the camera 42 is mounted to an underside 46 of the fuselage 22 of the supply aircraft 18. However, it is to be appreciated that the position of the camera 42 is not limited to any specific location on the receiver aircraft 34. Instead, the camera 42 is positioned in any location where a field-of-view 50 of the camera 42 captures the target object 12. For example, in the embodiment as shown in FIG. 1, the camera 42 may be mounted along any number of locations along the underside 46 of the fuselage 22 of the supply aircraft 18 as long as the field-of-view 50 of the camera 42 captures the fuel receptacle 32 and the receiver aircraft 34.

The range-sensing device 44 is any type of device for determining a distance to a specific target location without the need for physical contact. The range-sensing device 44 includes, but is not limited to, a laser range finder, an ultrasonic sensor, an infrared distance sensor, a light detection and ranging distance (lidar) sensor, or a sonar sensor. In the non-limiting embodiment as shown in FIG. 1, the range-sensing device 44 is mounted statically to a distal end 48 of the rigid portion 26 of the boom assembly 20. In the example as seen in FIG. 2, the range-sensing device 44 is also mounted to a distal end 52 of the extendable arm 38. As seen in both FIGS. 1 and 2, the line-of-sight L of the range-sensing device 44 is aligned with a longitudinal axis A-A of the extendable arm 38 (or the boom assembly 20). Accordingly, the control module 40 determines the position and the line-of-sight L of the range-sensing device 44 based on the movement of the extendable arm 38. For example, if the extendable arm 38 is a robotic arm, then the control module 40 determines the position and the line-of-sight L based on the robotic arm's joint angles.

It is to be appreciated that the range-sensing device 44 may be located in a variety of locations other than the rigid portion 26 of the boom assembly 20 as seem in FIG. 1 or on the extendable arm 38 as seen in FIG. 2. In other words, the line-of-sight L of the range-sensing device 44 may not be aligned with the longitudinal axis A-A of the extendable arm 38. Instead, the range-sensing device 44 is positioned in any location where the line-of-sight L of the range-sensing device 44 intersects with the target object 12. For example, in an alternative embodiment, the range-sensing device 44 is mounted directly adjacent to the camera 42 on the underside 46 of the fuselage 22 of the supply aircraft 18.

Referring to FIGS. 1 and 2, the position, orientation, and intrinsic parameters of the camera 42 are determined in a preliminary off-line camera calibration procedure or, alternatively, the intrinsic parameters are saved in a memory 1034 (FIG. 5) of the control module 40. Some examples of the intrinsic parameters of the camera 42 include, but are not limited to, resolution and aspect ratio. A three-dimensional representation 54 of the target object 12 is shown in phantom line in FIG. 2. The three-dimensional representation 54 is also saved in the memory 1034 of the control module 40 as well. The control module 40 is configured to predict the six degrees of freedom pose estimate 8 of the target object 12 (i.e., the fuel receptacle 32 and the receiver aircraft 34) based on the image data captured by the camera 42 using any number of pose estimation approaches. For example, in one non-limiting embodiment, the control module 40 determines the six-degree of freedom pose estimate 8 of the target object 12 based on a perspective-n-point algorithm.

Figure 3:
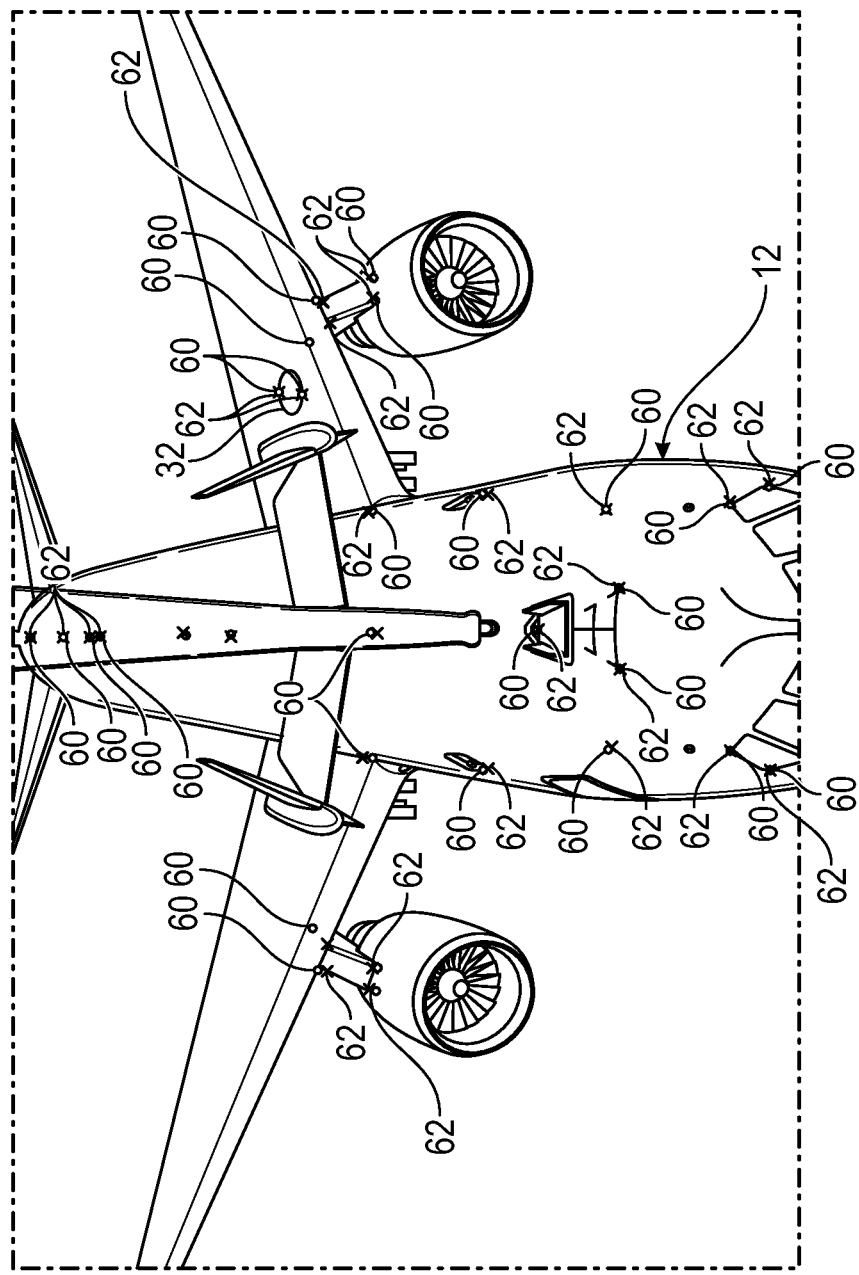
FIG. 3 is an illustration of an exemplary approach for determining the six degrees of freedom pose estimate of a target object based on a plurality of two-dimensional keypoints and a plurality of three-dimensional keypoints, according to an exemplary embodiment.

Referring to both FIGS. 1 and 3, the perspective-n-point algorithm estimates the six degrees of freedom pose estimate 8 (FIG. 2) of the target object 12 based on a plurality of two-dimensional keypoints 60 and a plurality of three-dimensional keypoints 62 (the two-dimensional keypoints 60 are shown as circles and the three-dimensional keypoints 62 are shown as crosses). Specifically, the perspective-n-point algorithm requires three or more three-dimensional keypoints 62 disposed on the target object 12. The three-dimensional keypoints 62 are detected by the control module 40 based on the image data captured by the camera 42. The control module 40 detects the three or more three-dimensional keypoints 62 on the target object 12 (i.e., the fuel receptacle 32) in each image frame of the image feed received from the camera 42. The control module 40 then predicts a corresponding two-dimensional keypoint 60 for each of the plurality of three-dimensional keypoints 62 using a deep neural network. The control module 40 then aligns the plurality of three-dimensional keypoints 62 with the corresponding two-dimensional keypoints 60, and then predicts the six degrees of freedom pose estimate based on the three-dimensional keypoints 62.

It is to be appreciated that while a perspective-n-point algorithm is described, other pose estimation processes may also be used to determine the six degrees of freedom pose estimate. For example, in an alternative approach, the six degrees of freedom pose estimate is determined based on two or more point-tangent correspondences between the three-dimensional keypoints 62 and the two-dimensional keypoints 60. In another embodiment, the six degrees of freedom pose estimate is determined by deep neural network that determines the six degrees of freedom pose estimate directly based on the image data captured by the camera 42.

Referring back to FIGS. 1 and 2, once the control module 40 determines the six degrees of freedom pose estimate 8, the control module 40 then aligns the longitudinal axis A-A of the extendable arm 38 in a direction towards the target object 12 (i.e., the receiver aircraft 34). It is to be appreciated that the initial six degrees of freedom pose estimate 8 as described above may be a locally coarse estimate, and the longitudinal axis A-A of the extendable arm 38 (and therefore the line-of-sight L of the range-sensing device 44) only needs to generally intersect with the target object 12 (i.e., the receiver aircraft 34). In the example as shown in FIGS. 1 and 2, since the nozzle 30 of the boom assembly 20 engages with the fuel receptacle 32 of the receiver aircraft 34 during a refueling operation, the range-sensing device 44 projects the line-of-sight L towards the fuel receptacle 32.

The range-sensing device 44 is configured to determine the actual distance d. Referring specifically to FIG. 2, the actual distance d is measured between the range-sensing device 44 and an actual point of intersection W'. The line-of-sight L projected by the range-sensing device 44 intersects with the target object 12 (i.e., the fuel receptacle 32) at the actual point of intersection W'. Thus, the actual distance d represents a one-dimensional depth measurement between the range-sensing device 44 and the target object 12. It is to be appreciated that prior to the pose refinement process using the range-sensing device 44, depth estimates, such as estimates of the distance d, are associated with the greatest amount of error when compared to length and height measurements. This is because the initial six degrees of freedom pose estimate is based on a perspective of the camera 42, which lacks depth cues. Furthermore, it is also to be appreciated that the position of the actual point of intersection W' upon a surface 70 of the receiver aircraft 34 need not be known. Finally, it is also to be appreciated that the actual point of intersection W' may lie anywhere upon the surface 70 of the receiver aircraft 34.

Referring specifically to FIG. 2, the control module 40 then determines an estimated point of intersection W. The estimated point of intersection W represents where the line-of-sight L intersects with the six degrees of freedom pose estimate 8 of the target object 12. As seen in FIG. 2, the estimated point of intersection W is offset from the actual point of intersection W' because of the coarseness of the initial six degrees of freedom pose estimate 8. The control module 40 then determines an estimated distance D measured between the range-sensing device 44 and the estimated point of intersection W. The control module 40 then calculates the absolute error associated with the six degrees of freedom pose estimate 8 of the target object 12 based on a difference between the actual distance d and the estimated distance D. Specifically, the absolute error is expressed in Equation 1 as:

$$\|W-(O+dL)\|^2 \qquad \text{Equation 1}$$

where O represents a base of the extendable arm 38, which is shown in FIG. 2, and W'=(O+dL). In other words, Equation 1 may be expressed as $\|W-W'\|^2$.

In addition to the absolute error, in one embodiment the control module 40 also determines the reprojection error introduced by the six degrees of freedom pose estimate 8. Specifically, the reprojection error represents a difference between a plurality of two-dimensional pixel positions and the plurality of two-dimensional keypoints 60 shown in FIG. 3. The plurality of two-dimensional pixel positions are determined by projecting the three-dimensional keypoints 62 (FIG. 2) into two-dimensional space. It is to be appreciated that the three-dimensional keypoints 62 shown in FIG. 3 are represented in camera space. The camera space refers to a three-dimensional coordinate system having an origin represented by a center C of the camera 42 (FIG. 1), where a user defines the three axes (i.e., x, y, and z). Thus, the three-dimensional keypoints 62 indicate how the target object 12 appears with respect to the perspective view of the camera 42. For example, if the target object 12 is located 20 meters straight in front of the camera 42, then a z-coordinate (which is assumed to be aligned with a line-of-sight of the camera 42) of the resulting three-dimensional keypoint 62 would be 20 meters. It is also to be appreciated that when the three-dimensional keypoints 62 are projected into the two-dimensional space to represent the two-dimensional pixel locations, the three-dimensional keypoints 62 are flattened along a depth dimension. However, the range-sensing device 44 is substantially aligned with the depth dimension, and therefore adds information that is otherwise missing from the two-dimensional pixel locations.

The reprojection error of the perspective-n-point algorithm is expressed in Equation 2 as:

$$\|P(V[RX+t])-y'\|^2 \qquad \text{Equation 2}$$

where P represents a camera projection function of the camera 42, V represents a coordinate transform matrix, R represents a rotation matrix representing the three orientation components (pitch, roll, and yaw) of the six degrees of freedom parameters, X represents a matrix containing the plurality of three-dimensional keypoints 62, t represents a vector representing the positional components (x, y, and z), of the six degrees of freedom parameters, and y' represents the two-dimensional keypoints 60 (shown in FIG. 3). The camera projection function of the camera 42 converts the three-dimensional keypoints 62, which are represented by the camera space, into the two-dimensional dimensional space. The coordinate transform matrix V converts the three-dimensional keypoints 62 represented in model space into the camera space. The model space represents a three-dimensional coordinate system having an origin 74 (seen in FIG. 2) that is located at a center of the three-dimensional representation 54. The vector t contains the positional components of the six degrees of freedom parameters and defines the translation between origin 74 of the model space and the center C of the camera space. Similarly, the rotation matrix R contains the orientation components of the six degrees of freedom parameters and defines the rotation between the axes defined in model space and the axes defined in camera space.

In one embodiment, the control module 40 determines the revised six degrees of freedom pose estimate based on just the absolute error. In this embodiment, the control module 40 determines a minimum value of the absolute error, and then calculates the revised six degrees of freedom pose estimate produces or results in the minimum value of the absolute error. In other words, control module 40 determines a value for the refined six degrees of freedom pose estimate associated with the least amount of absolute error. The minimum value of the absolute error is expressed in Equation 3 as:

$$\min_{\theta}\|W-(O+dL)\|^2 \qquad \text{Equation 3}$$

where θ represents the six degrees of freedom pose estimate of the target object 12, i.e., θ=[x, y, z, pitch, roll, yaw].

In another embodiment, the control module 40 determines the revised six degrees of freedom pose estimate 8 based on both the absolute error and the reprojection error. In an embodiment, the control module 40 determines the revised six degrees of freedom pose estimate by first determining a minimum value of a weighted sum, where the weighted sum combines the absolute error and the reprojection error together. The weighted sum is expressed in Equation 4 as:

$$\min_{\theta}\|P(V[RX+t])-y'\|^2 + \lambda^2\|W-(O+dL)\|^2 \qquad \text{Equation 4}$$

where λ represents a use-defined scale factor. Changing a value of the scale factor λ results in a specific implementation to account for the relative accuracies of the range-sensing device 44 and the six degree of freedom pose estimate 8. The minimum value of the weighted sum is determined based on a non-linear least square algorithm. There are several types of non-linear least square algorithms available that may be used to determine the minimum value of the weighted sum. Some examples of non-linear least square algorithms include, but are not limited to, Gauss-Newton methods, a Levenberg-Marquardt algorithm, a gradient method such as a conjugate-gradient method, and direct search methods such as a Nelder-Mead simplex search.

Figure 4A:
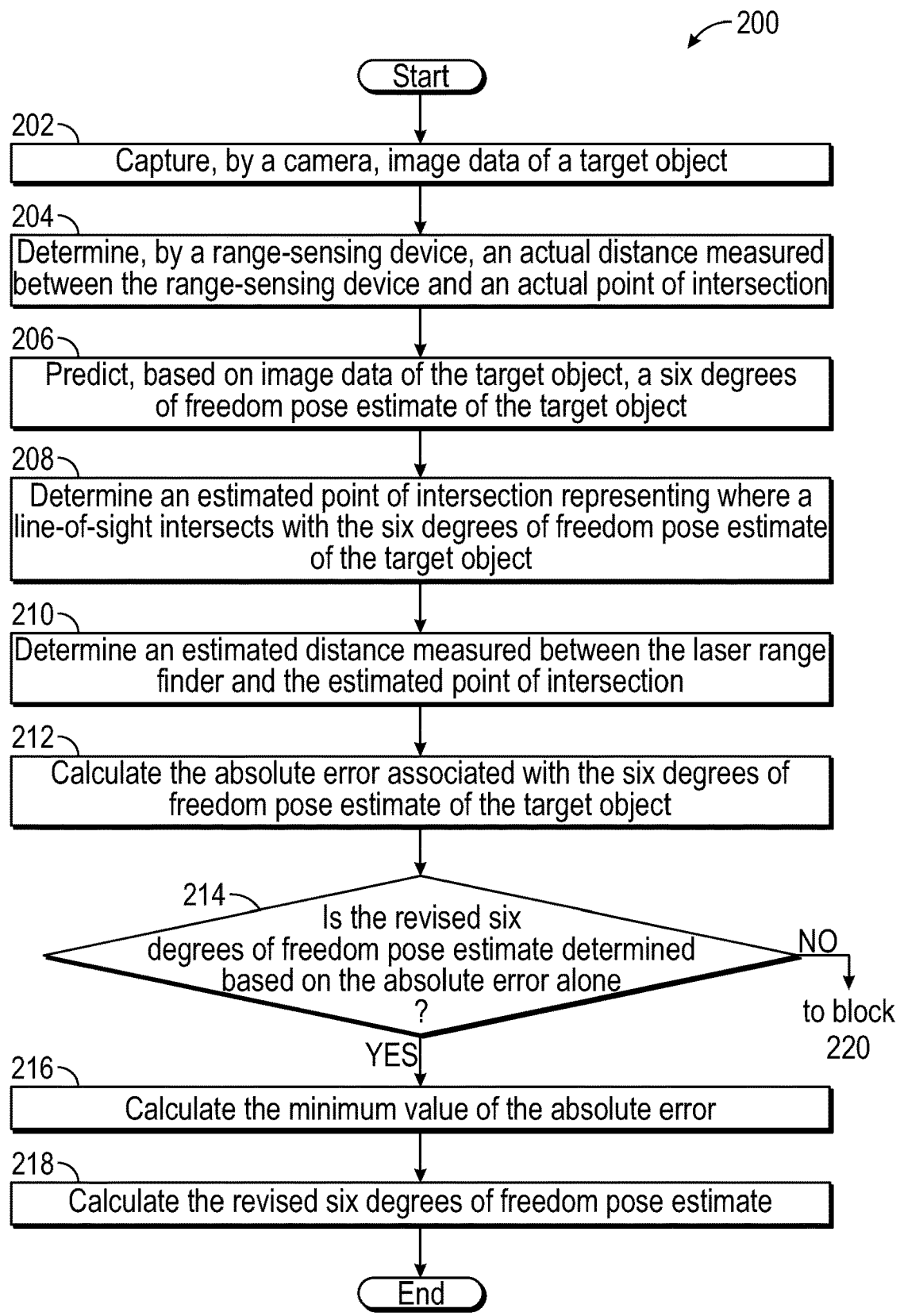
FIGS. 4A-4B are a process flow diagram illustrating a method for refining a six degrees of freedom pose estimate of the target object, according to an exemplary embodiment.
Figure 4B:
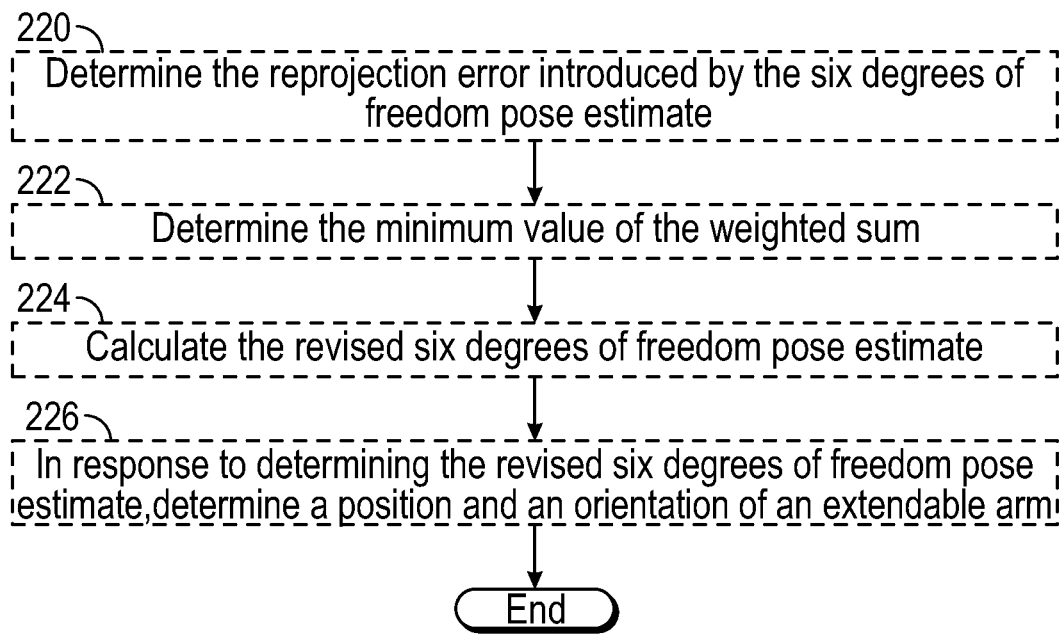

FIGS. 4A-4B is an exemplary process flow diagram illustrating a method 200 for refining the six degrees of freedom pose estimate 8 (FIG. 2) of the target object 12. Referring generally to FIGS. 1-4A, the method 200 begins at block 202. In block 202, the camera 42 captures the image data of the target object 12. The method 200 may then proceed to block 204.

In block 204, the range-sensing device 44 determines the actual distance d. As mentioned above, the actual distance d is measured between the range-sensing device 44 and the actual point of intersection W' (seen in FIG. 2), where the range-sensing device 44 projects the line-of-sight L that intersects with the target object 12 at the actual point of intersection W'. The method 200 may then proceed to block 206.

In block 206, the control module 40 predicts, based on the image data of the target object 12, the six degrees of freedom pose estimate 8 of the target object 12. As explained above, the six degrees of freedom pose estimate 8 may be determined using any number of pose estimation approaches such as, for example, the perspective-n-point algorithm. The method 200 may then proceed to block 208.

In block 208, the control module 40 determines the estimated point of intersection W (FIG. 2) representing where the line-of-sight L intersects with the six degrees of freedom pose estimate 8 of the target object 12. The method 200 may then proceed to block 210.

In block 210, the control module 40 determines the estimated distance D measured between the range-sensing device 44 and the estimated point of intersection W. The method 200 may then proceed to block 212.

In block 212, the control module 40 calculates the absolute error associated with the six degrees of freedom pose estimate 8 of the target object 12 based on a difference between the actual distance and the estimated distance. The method 200 may then proceed to decision block 214.

In decision block 214, the revised six degree of freedom estimate is determined based on either the absolute error alone or, in the alternative, based on the absolute error and the reprojection error. If the control module 40 determines the revised six degree of freedom pose estimate is determined based on the absolute error alone, then the method proceeds to block 216.

In block 216, the control module 40 calculates the minimum value of the absolute error. As explained above, the control module 40 calculates the absolute error associated with the six degrees of freedom pose estimate 8 of the target object 12 based on a difference between the actual distance d and the estimated distance D and is expressed in Equation 1. The method 200 may then proceed to block 218.

In block 218, the control module 40 calculates the revised six degrees of freedom pose estimate, where the revised six degree of freedom pose estimate produces the minimum value of the absolute error. The method 200 may then terminate.

Referring back to decision block 214, if the revised six degrees of freedom pose estimate is not determined based on the absolute error alone, then the method 200 proceeds to block 220, which is shown in FIG. 4B. Specifically, if the control module 40 determines the revised six degree of freedom pose estimate based on both the absolute error and the reprojection error then the method 200 proceeds to block 220.

Figure 4C:
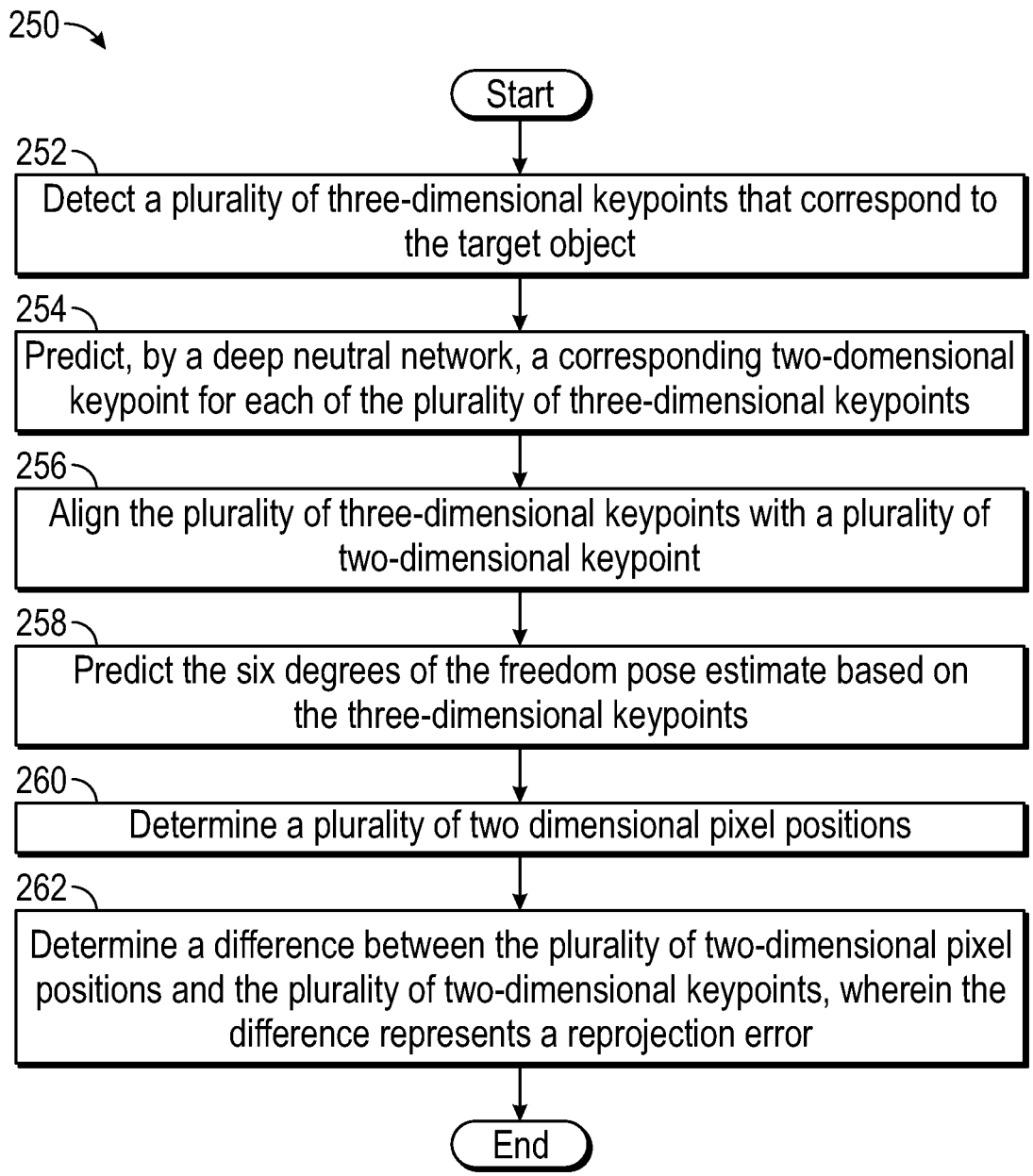
FIG. 4C is a process flow diagram illustrating a method for determining the reprojection error.

In block 220, the control module 40 determines the reprojection error introduced by the six degrees of freedom pose estimate 8 of the target object 12. As explained above, the reprojection error represents the difference between the plurality of two-dimensional pixel positions and the plurality of two-dimensional keypoints 60 shown in FIG. 3. It is to be appreciated that a process flow diagram for determining the reprojection error is shown in FIG. 4C. The method 200 may then proceed to block 222.

In block 222, the control module 40 determines the minimum value of the weighted sum, where the weighted sum combines the absolute error and the reprojection error together. The minimum value of the weighted sum may be determined using a variety of different approaches such as, for example, the Levenberg-Marquardt algorithm. The method 200 may then proceed to block 224.

In block 224, the control module 40 calculates the revised six degrees of freedom pose estimate, where the revised six degrees of freedom pose estimate produces the minimum value of the weighted sum. In an embodiment, the method 200 may then proceed to block 226.

In block 226, in one embodiment, the disclosed system 10 includes the extendable arm 38 (seen in FIG. 1 as the boom assembly 20 and in FIG. 2). Accordingly, in block 226, in response to determining the revised six degrees of freedom pose estimate, the control module 40 determines a position and an orientation of the extendable arm 38 based on the revised six degrees of freedom pose estimate. The method 200 may then terminate.

Referring now to FIG. 4C, a process flow diagram illustrating a method 250 for determining the reprojection error is now described. Referring to FIGS. 1, 3, and 4C, the method 250 begins at block 252. In block 252, the control module 40 detects the plurality of three-dimensional keypoints 62 that correspond to the target object 12 based on the image data captured by the camera 42. The method 250 may then proceed to block 254.

The block 254, a deep neural network predicts the corresponding two-dimensional keypoint 60 for each of the plurality of three-dimensional keypoints 62. The method 250 may then proceed to block 256.

In block 256, the control module 40 aligns the plurality of three-dimensional keypoints 62 with the plurality of two-dimensional keypoints 60. The method 250 may then proceed to block 258.

In block 258, the control module 40 predicts the six degrees of freedom pose estimate 8 based on the three-dimensional keypoints 62. The method 250 may then proceed to block 260.

In block 260, the control module 40 determines the plurality of two-dimensional pixel positions by projecting the plurality of three-dimensional keypoints 62 into two-dimensional space. The method 250 may then proceed to block 262.

In block 262, the control module 40 determines the difference between a plurality of two-dimensional pixel positions and the plurality of two-dimensional keypoints 60, where the difference between the plurality of two-dimensional pixel positions and the plurality of two-dimensional keypoints 60 represent the reprojection error. The method 250 may then terminate.

Referring generally to the figures, the disclosed system provides various technical effects and benefits. Specifically, the disclosed system utilizes a single one-dimensional measurement from the range-sensing device for refining the six degrees of freedom pose estimate as opposed to a two-dimensional scan or, alternatively, a three-dimensional depth map. Accordingly, the disclosed system does not require significant processing and memory allocation requirements or a laser range finder having precisely manufactured moving parts like some conventional systems currently available. Additionally, the disclosed system does not require specialized calibration patterns or correspondence markers during the refinement process, unlike some conventional systems currently available as well.

Figure 5:
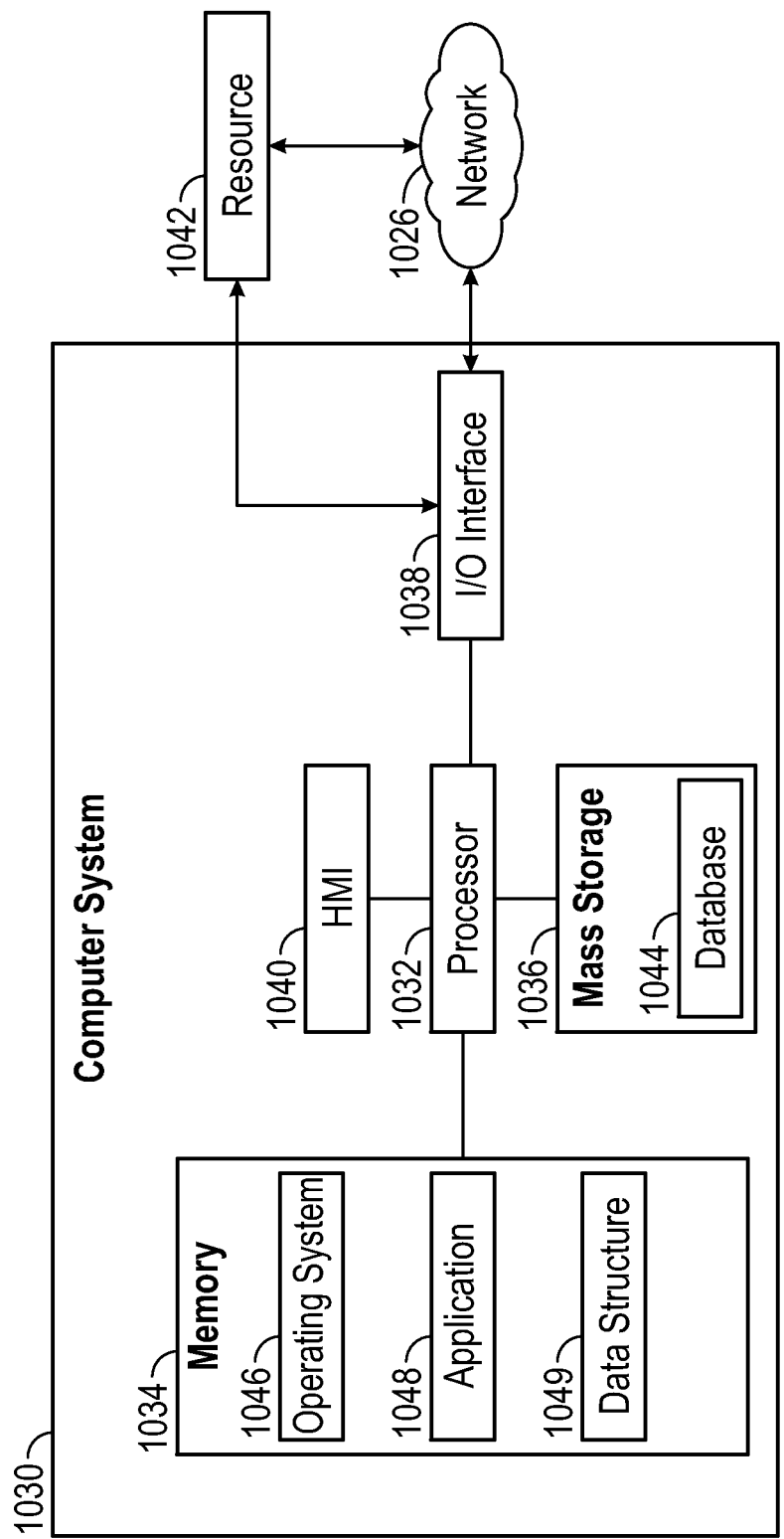
FIG. 5 is an illustration of a computer system for the disclosed system shown in FIG. 1, according to an exemplary embodiment.

Referring to FIG. 5, the control module 40 of FIG. 1 may be implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system (10) for refining a six degrees of freedom pose estimate (8) of a target object (12) based on a one-dimensional measurement, the system (10) comprising:
   a camera (42) configured to capture image data of the target object (12);
   a range-sensing device (44) configured to determine an actual distance (d) measured between the range-sensing device (44) and an actual point of intersection (W'), wherein the range-sensing device (44) projects a line-of-sight (L) that intersects with the target object (12) at the actual point of intersection (W');
   one or more processors (1032) in electronic communication with the camera (42) and the range-sensing device (44); and
   a memory (1034) coupled to the one or more processors (1032), the memory (1034) storing data into one or more databases (1044) and program code that, when executed by the one or more processors (1032), causes the system (10) to:
     predict (206), based on the image data of the target object (12), the six degrees of freedom pose estimate (8) of the target object (12);
     determine (208) an estimated point of intersection (W) representing where the line-of-sight (L) intersects with the six degrees of freedom pose estimate (8) of the target object (12);
     determine (210) an estimated distance (D) measured between the range-sensing device (44) and the estimated point of intersection (W);
     calculate (212) an absolute error associated with the six degrees of freedom pose estimate (8) of the target object (12) based on a difference between the actual distance (d) and the estimated distance (D); and
     calculate (216) a revised six degrees of freedom pose estimate of the target object (12) based on at least the absolute error.

2. The system (10) of claim 1, wherein the one or more processors (1032) execute instructions to:
   calculate (214) a minimum value of the absolute error; and
   calculate (216) the revised six degrees of freedom pose estimate, wherein the revised six degrees of freedom pose estimate produces the minimum value of the absolute error.

3. The system (10) of claim 1, wherein the one or more processors (1032) execute instructions to:
   determine (218) a reprojection error introduced by the six degrees of freedom pose estimate (8) of the target object (12);

determine (220) a minimum value of a weighted sum, wherein the weighted sum combines the absolute error and the reprojection error together; and calculate (222) the revised six degrees of freedom pose estimate, wherein the revised six degrees of freedom pose estimate produces the minimum value of the weighted sum.

4. The system (10) of claim 3, wherein the one or more processors (1032) determine the minimum value of the weighted sum based on a non-linear least square algorithm.

5. The system (10) of claim 1, wherein the one or more processors (1032) execute instructions to:

determine the six degrees of freedom pose estimate (8) of the target object (12) based on a perspective-n-point algorithm.

6. The system (10) of claim 5, wherein the one or more processors (1032) execute instructions to:

detect (252) a plurality of three-dimensional keypoints (62) that correspond to the target object (12) based on the image data captured by the camera (42);

predict (254), by a deep neural network, a corresponding two-dimensional keypoint (60) for each of the plurality of three-dimensional keypoints (62);

align (256) the plurality of three-dimensional keypoints (62) with a plurality of two-dimensional keypoints (62); and predict (258) the six degrees of freedom pose estimate (8) based on the three-dimensional keypoints (62).

7. The system (10) of claim 6, wherein the one or more processors (1032) execute instructions to:

determine (260) a plurality of two-dimensional pixel positions by projecting the plurality of three-dimensional keypoints (62) into two-dimensional space; and determine (262) a difference between a plurality of two-dimensional pixel positions and the plurality of two-dimensional keypoints (60), wherein the difference between the plurality of two-dimensional pixel positions and the plurality of two-dimensional keypoints (60) represent a reprojection error.

8. The system (10) of claim 1, further comprising an extendable arm (38) defining a longitudinal axis, wherein the longitudinal axis of the extendable arm (38) is aligned with the line-of-sight (L) of the range-sensing device (44).

9. The system (10) of claim 8, wherein the extendable arm (38) is a boom assembly (20) of an aerial refueling system (14) or a robotic arm.

10. The system (10) of claim 8, wherein the range-sensing device (44) is mounted statically to the extendable arm (38).

11. The system (10) of claim 8, wherein the one or more processors (1032) execute instructions to:

in response to determining the revised six degrees of freedom pose estimate, determine (224) a position and an orientation of the extendable arm (38) based on the revised six degrees of freedom pose estimate.

12. The system (10) of claim 1, wherein the range-sensing device (44) is a laser range finder, an ultrasonic sensor, an infrared distance sensor, a light detection and ranging distance (lidar) sensor, or a sonar sensor.

13. The system (10) of claim 1, wherein the actual distance (d) represents a one-dimensional depth measurement between the range-sensing device (44) and the target object (12).

14. An aerial refueling system (14) for a supply aircraft (18), the aerial refueling system (14) comprising:

a boom assembly (20) including a nozzle (30); and
a system (10) for determining a revised six degrees of freedom pose estimate of a fuel receptacle (32) located on a receiver aircraft (34), wherein the nozzle (30) of the boom assembly (20) is configured to engage with a fuel receptacle (32) of the receiver aircraft (34) during a refueling operation, the system (10) comprising:

a camera (42) configured to capture (202) image data of the receiver aircraft (34) and the fuel receptacle (32);

a range-sensing device (44) configured to determine (204) an actual distance (d) measured between the range-sensing device (44) and an actual point of intersection (W'), wherein the range-sensing device (44) projects a line-of-sight (L) that intersects with the receiver aircraft at the actual point of intersection (W');

one or more processors (1032) in electronic communication with the camera (42) and the range-sensing device (44); and a memory (1034) coupled to the one or more processors (1032), the memory (1034) storing data into one or more databases (1044) and program code that, when executed by the one or more processors (1032), causes the system (10) to:

predict (206), based on the image data of the fuel receptacle (32) located on the receiver aircraft (34), a six degrees of freedom pose estimate (8) of the fuel receptacle (32) located on the receiver aircraft (34);

determine (208) an estimated point of intersection (W) representing where the line-of-sight (L) intersects with the six degrees of freedom pose estimate (8) of the receiver aircraft (34);

determine (210) an estimated distance (D) measured between the range-sensing device (44) and the estimated point of intersection (W);

calculate (212) an absolute error associated with the six degrees of freedom pose estimate (8) of the fuel receptacle (32) located on the receiver aircraft (34) based on a difference between the actual distance (d) and the estimated distance (D); and calculate (216) the revised six degrees of freedom pose estimate based on at least the absolute error.

15. The aerial refueling system (14) of claim 14, wherein the one or more processors (1032) execute instructions to:

calculate (214) a minimum value of the absolute error; and calculate (216) the revised six degrees of freedom pose estimate, wherein the revised six degrees of freedom pose estimate produces the minimum value of the absolute error.

16. The aerial refueling system (14) of claim 14, wherein the one or more processors (1032) execute instructions to:

determine (218) a reprojection error introduced by the six degrees of freedom pose estimate (8) of the fuel receptacle (32) located on the receiver aircraft (34);

determine (220) a minimum value of a weighted sum, wherein the weighted sum combines the absolute error and the reprojection error together; and calculate (222) the revised six degrees of freedom pose estimate, wherein the revised six degrees of freedom pose estimate produces the minimum value of the weighted sum.

17. A method (200) for refining a six degrees of freedom pose estimate (8) of a target object (12), the method (200) comprising:

capturing (202), by a camera (42), image data of the target object (12);

determining (204), by a range-sensing device (44), an actual distance (d) measured between the range-sensing device (44) and an actual point of intersection (W'), wherein the range-sensing device (44) projects a line-of-sight (L) that intersects with the target object (12) at the actual point of intersection (W');

predicting (206), based on the image data of the target object (12), the six degrees of freedom pose estimate (8) of the target object (12);

determining (208) an estimated point of intersection (W) representing where the line-of-sight (L) intersects with the six degrees of freedom pose estimate (8) of the target object (12);

determining (210) an estimated distance (D) measured between the range-sensing device (44) and the estimated point of intersection (W);

calculating (212) an absolute error associated with the six degrees of freedom pose estimate (8) of the target object (12) based on a difference between the actual distance (d) and the estimated distance (D); and calculate (216) a revised six degree of freedom pose estimate based on at least the absolute error.

18. The method of claim 17, further comprising:
calculating (214) a minimum value of the absolute error; and
calculating (216) the revised six degrees of freedom pose estimate, wherein the revised six degrees of freedom pose estimate produces the minimum value of the absolute error.

19. The method of claim 17, further comprising:
determining (218) a reprojection error introduced by the six degrees of freedom pose estimate (8) of the target object (12);
determining (220) a minimum value of a weighted sum, wherein the weighted sum combines the absolute error and the reprojection error together; and
calculating (222) the revised six degrees of freedom pose estimate, wherein the revised six degrees of freedom pose estimate produces the minimum value of the weighted sum.

20. The method of claim 17, wherein the six degrees of freedom pose estimate (8) of the target object (12) is determined based on a perspective-n-point algorithm.

\* \* \* \* \*